Aug. 12, 1969  J. F. REINKER, JR  3,460,569

IDENTICAL HALVES COUPLING

Filed Jan. 19, 1966  2 Sheets-Sheet 1

INVENTOR
JOSEPH F. REINKER, JR.

BY
*Jerry K. Harness*
*His* ATTORNEY

Aug. 12, 1969   J. F. REINKER, JR   3,460,569
IDENTICAL HALVES COUPLING
Filed Jan. 19, 1966   2 Sheets-Sheet 2
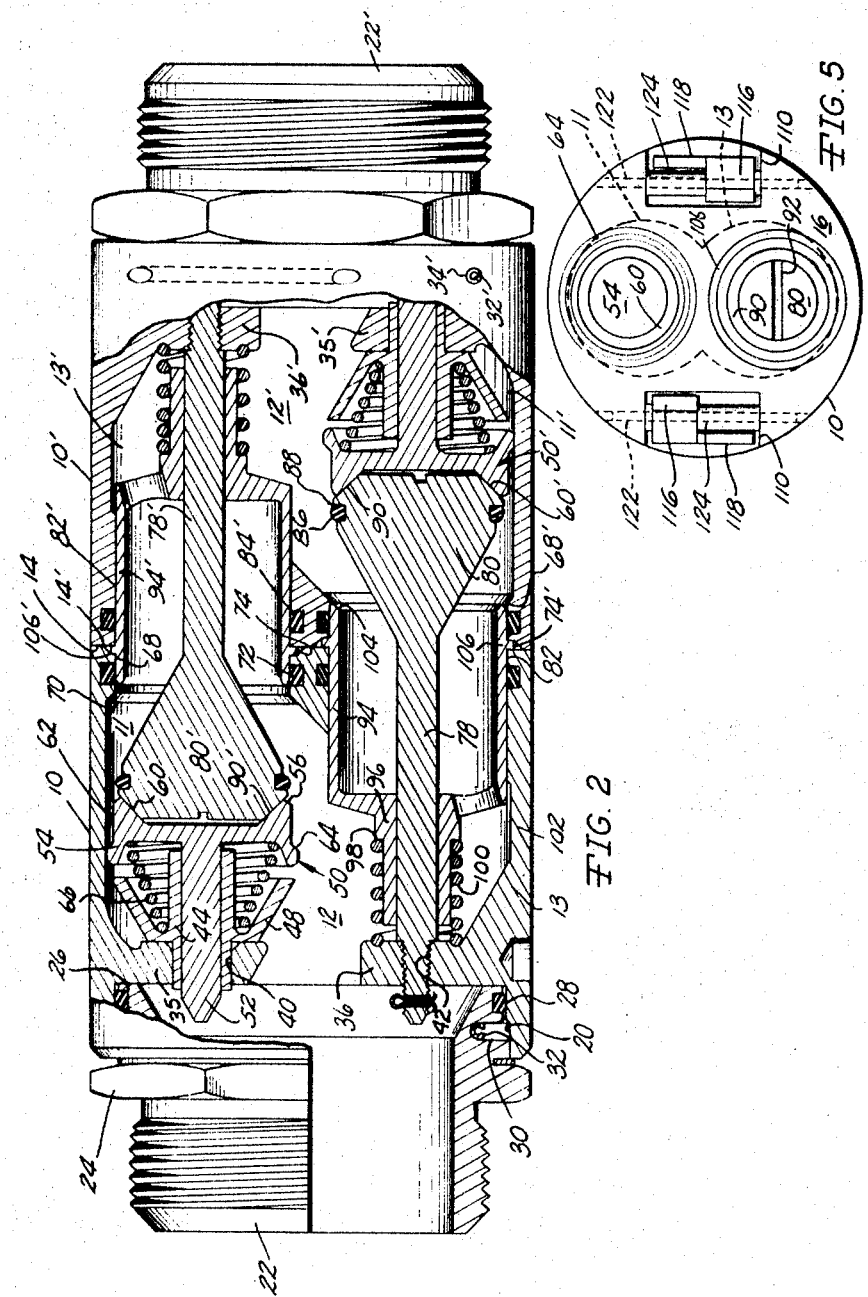
INVENTOR
JOSEPH F. REINKER, JR.
BY
Jerry K Harness
His ATTORNEY

United States Patent Office 3,460,569
Patented Aug. 12, 1969

3,460,569
IDENTICAL HALVES COUPLING
Joseph F. Reinker, Jr., Jackson, Mich., assignor to Aeroquip Corporation, Jackson, Mich.
Filed Jan. 19, 1966, Ser. No. 521,592
Int. Cl. F16l 37/28
U.S. Cl. 137—599    3 Claims

ABSTRACT OF THE DISCLOSURE

A self-sealing coupling employing identical coupling halves, having outer ends defining planar contacting surfaces each having first and second wall and seal means defining respective first and second passages therethrough. Male valve means associated with the first passage has a stem extending therethrough and terminates in an enlarged head. A sleeve valve is slidably mounted on the stem and in the first wall and seal means and seats on the head. A female valve member slides in the second wall and seal means and closes the second passage. The male member is adapted to unseat the female member from the second wall and seal means and permit the end of the sleeve to slide into engagement therewith, whereupon the sleeve is unseated from the enlarged head and the passage is opened.

---

Figure 1:
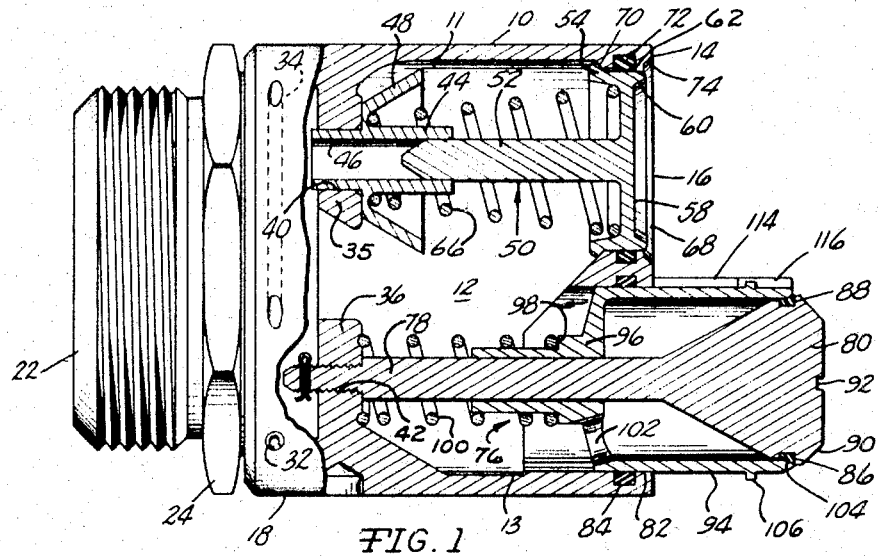

This invention pertains to self-sealing, fluid-conducting couplings and particularly relates to self-sealing couplings wherein each half of the coupling is identical and wherein two of such couplings may be directly interconnected to complete a fluid circuit.

Self-sealing, fluid-conducting couplings are normally constructed in one of three types. The most common type is the standard male and female type wherein one of the coupling halves is so shaped as to be received within the other coupling half. The coupling halves are either designated male or female and construction differences exist between the two coupling halves to permit the desired interconnection using conventional O-rings as seals. Each coupling contains a valve which is displaced upon interconnection of the halves to permit fluid flow through the coupling upon complete connection of the coupling halves.

A disadvantage of this type of coupling lies in the differences between the construction of the coupling halves and the necessity for maintaining both male and female halves in inventory wherein each coupling half requires parts usually dissimilar from the parts of the other coupling half.

Another type of self-sealing coupling is the so-called neuter coupling wherein the coupling halves are of similar construction but require a face or butt type seal between the halves. This type of coupling does not use the conventional O-ring construction and is subject to leakage from cocking or misalignment between the halves, and a considerable amount of fluid loss and air inclusion into the fluid system is experienced due to the entrapment of fluid and air within the intermediate seal.

A third type of self-sealing coupling which is available is the convertible coupling wherein attachments are used with the coupling halves for converting either coupling half from a "male" coupling to a "female" coupling. This structure is rather complicated and employs sliding sleeves and complex latches and necessitates the use of close clearances and high precision parts. The complexity of this type of coupling often causes difficulty in connecting the halves, and the coupling is subject to jamming due to dirt contamination in view of the close clearances used in the manufacture of the coupling halves.

The invention pertains to a self-sealing fluid coupling wherein both of the coupling halves are truly identical and no intermediate face or butt type seal is required, nor do the coupling halves need to be converted. In the practice of the invention, each coupling half contains both "male" and "female" valve components. The identical construction of the coupling halves of the coupling of the invention minimizes inventory requirements and replacement part costs and inventories. Furthermore, the identical half coupling of the invention provides a versatility to a fluid system which has heretofore not been possible to create. Not only may a coupling half made in accord with the invention be connected to any other component of a fluid system having a similar coupling mounted thereto but the double valve arrangement on each coupling half allows the use of the readily available, readily replaceable and reliable O-rings for sealing purposes.

It is, therefore, a basic object of the invention to provide a self-sealing, fluid-conducting coupling wherein each half of the coupling is identical in construction and operation and requires no modification in use.

Another object of the invention is to provide a self-sealing coupling which incorporates identical coupling halves and wherein the halves may be quickly interconnected or disconnected with minimum fluid loss or air inclusion into the fluid system.

An additional object of the invention is to provide a self-sealing coupling incorporating identical coupling halves wherein the connecting means interconnecting the halves is dependable in operation, simple in construction, and is not likely to be accidentally tripped.

A further object of the invention is to provide a self-sealing coupling employing identical coupling halves wherein the forces necessary to connect the coupling halves when pressurized is substantially reduced over more conventional pressurized self-sealing coupling constructions.

Another object of the invention is to provide a self-sealing coupling employing identical coupling halves wherein a sleeve type valve and a poppet type valve are incorporated within each coupling half and efficient flow characteristics through the coupling halves are provided.

Figure 3:
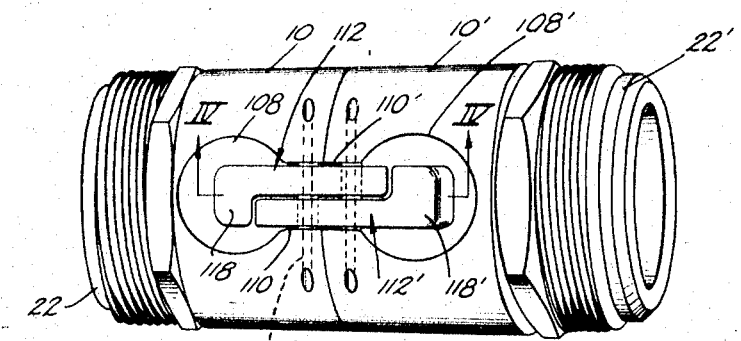
Figure 4:
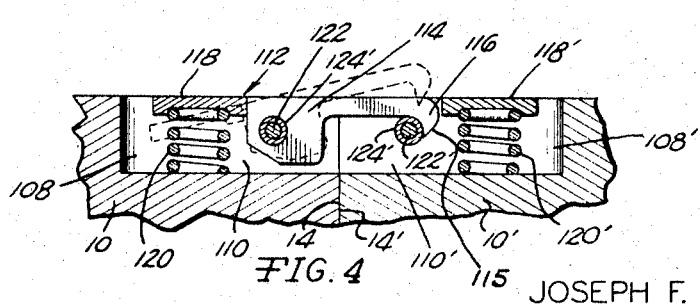

These and other objects of the invention arising from the details and relationships of the components of an embodiment thereof will be apparent from the following description and accompanying drawings wherein:

FIG. 1 is an elevational view, partially sectioned, illustrating a coupling half in accord with the invention, the valves being in the normal closed position, FIG. 2 is an elevational view, partially sectioned, of a fluid coupling constructed in accord with the invention wherein the coupling halves are fully interconnected for fluid flow therethrough, FIG. 3 is an elevational view of the coupling halves of the invention shown in the interconnected relationship illustrating one-half of the latching means, FIG. 4 is an elevational, sectional view of the coupling latching means as taken along section IV—IV of FIG. 3, the "unlatched" position of a latch being shown in dotted lines, and FIG. 5 is an elevational view of the end of the coupling half of FIG. 1 as taken from the right.

As the coupling halves constituting a coupling in accord with the invention are identical in every respect, it is necessary to describe only a single half in order to appreciate the features of construction of the coupling. Thus, the coupling half of FIG. 1 will be described in detail and this coupling half constitutes the left coupling half as shown in FIG. 2. The components of the right coupling half corresponding to those of the left coupling half of FIG. 2 are indicated by primed reference numerals.

The coupling half body 10 is of an exterior cylindrical configuration and is internally formed as to be hollow and defining an internal chamber 12. The chamber 12 is preferably formed by a pair of intersecting passages or channels 11 and 13 axially extending through the body 10. The outer end 14 of the coupling body 10 includes a transverse wall 16 which completely encloses the outer end of the body except for the fluid passages defined therein. The coupling half body inner end 18 is formed with a cylindrical bore 20 concentric to the body exterior surface and attachment fitting means are mounted to the body 10 at the inner end within bore 20 permitting the body to be attached to a flexible hose, valve, tank, pipe or other component of the fluid system with which the coupling is to be employed. In the illustrated embodiment, the fitting 22 comprises a swivel type connection which is exteriorly threaded and includes a portion having wrench flats 24 defined thereon. The fitting also includes a cylindrical portion 26 having an annular groove defined therein for receiving the O-ring 28 which sealingly cooperates with the body bore 20. Retention of the fitting 22 in the body 10 is accomplished by means of an annular groove 30 defined in the fitting which is adapted to receive pins 32 which are inserted through holes 34 defined in the body 10 in alignment with the groove 30. Three or four pins 32 are associated with the groove 30 spaced about the circumference of the body and their reception within the fitting groove axially locates the fitting with respect to the body 10, yet permits the fitting to be rotated with respect thereo.

Supports 35 and 36 are integrally cast in the body 10. Support 35 is provided with a cylindrical bore 40 while support 36 has a threaded bore 42 both of which extend in the axial direction of the fitting.

A spring retainer and poppet valve guide 44 is provided with a cylindrical portion adapted to be tightly received within the bore 40 of the support 35. The guide 44 includes an internal cylindrical bore 46 and a conical shield 48 wherein a spring receiving recess is defined between the shield and the cylindrical hub portion of the guide. It will be noted that the shield 48 is of a configuration wherein a minimum of fluid turbulence will be produced by the shield during fluid flow through the coupling.

The guide 44 supports a poppet type valve 50 within the coupling body. The poppet valve 50 includes a cylindrical stem 52 which is slidably received within the bore 46 and is formed with a conical configuration at its outer end. The other end of the stem 52 is formed with a radially extending head 54. The head 54 includes a cylindrically formed sealing surface 62 and is recessed at 58 at its outer end to conform to the configuration of the head of the male stem of the mating coupling half, as will be later described. The recess 58 preferably includes a conical wall 60. The head 54 also includes an annular conical surface 64 which serves as a stop to determine the closed axial position of the valve 50.

A compression spring 66 is interposed between the guide 44 and the valve head 54. Preferably, the spring 66 is of the conical type wherein the diameter of the coils sequentially increases from the retainer to the head. Thus, the spring 66 is capable of being compressed into a short axial dimension, as will be apparent from FIG. 2.

The body wall 16 is provided with a passage or opening 68 in axial alignment with the valve 50. The opening 68 includes a conical stop surface 70 adapted to engage the valve surface 64 and the valve surface 62 is closely received within the opening 68. An annular groove is defined above the opening 68 for receiving the annular resilient gasket 72 which sealingly cooperates with the valve head surface 62 in the closed position of the valve, as shown in FIG. 1. A recess 74 is defined in the outer surface of the wall 16 concentric to the opening 68 for receiving the sleeve valve ridge of the other coupling half when the coupling halves are assembled, as will be later described.

The threaded bore 42 defined in the support 36 is employed to support a male valve assembly 76 having a cylindrical stem 78 which includes an enlarged head 80 and a threaded end which is received within the threaded bore 42. For improving flow characteristics, the outer end of the threaded stem portion may be conical, as is apparent in FIG. 2. The stem 78 is of such a length that the head 80 is axially positioned substantially beyond the body wall 16. To permit the stem and head to extend through the body wall 16, a cylindrical passage or opening 82 is defined in the body wall concentric to the stem.

An annular groove circumscribes the opening 82 and an annular elastic gasket 84 is received therein. The head 80 is provided with an annular groove in which the resilient sealing ring 86 is formed. Adjacent the ring 86, the head 80 includes a radially extending shoulder 88 which forms an abutment surface for the valve sleeve, as will be later apparent. The outer portion of the head 80 is provided with a conical surface 90 which corresponds to the configuration of the conical recess surface 60 defined in the valve head 54. A slot 92, or similar means, will usually be defined in the head 80 to facilitate rotating the stem for threading into the bore 42.

A valve sleeve 94 is mounted upon the stem 78 for movement between open and closed positions relative to the head 80. The sleeve 94 includes a hub 96 having a cylindrical portion slidably received on the stem 78. An annular abutment 98 is defined on the hub which receives one end of a compression spring 100, the latter being interposed between the abutment and the support 36 for biasing the sleeve 94 toward the position shown in FIG. 1. Openings 102 are defined between the sleeve and hub whereby fluid may pass from the interior of the sleeve to the body chamber 12. The sleeve 94 is provided with a cylindrical outer surface which sealingly engages the gasket 84 and the outer end of the sleeve is formed with a conical surface 104 adapted to sealingly engage the resilient ring 86. The outer end of the sleeve is adapted to abuttingly engage the stem head shoulder 88 whereby engagement of the end of the sleeve with the head shoulder 88 limits outward movement of the sleeve on the stem. An annular ridge 106 is defined on the sleeve outer surface axially removed from the sleeve end for reception into the recess 74 defined on the other coupling half. As will be apparent in FIG. 2, the ridge 106 is formed of a configuration substantially identical to that of the recess 74 whereby the ridge is closely received within the associated recess of the mating coupling half.

Interconnection between the coupling bodies 10 and 10' is maintained by a latch system which is shown in FIGS. 3, 4 and 5. At diametrically opposed locations, the body 10 is formed with recesses 108 and associated slots 110 intersecting the outer end 14 of the body. Within each recess and slot, a latch lever 112 is pivotally mounted. The latch levers each include an elongated body portion 114 having an outer end adapted to extend beyond the body end wall 16, note FIG. 1. At the outer end of the portion 114 a hook 116 is defined. The inner end of the latch lever includes an actuating portion 118 wherein radial inward depression of the portion 118 actuates the latch lever. Within the recess 108 a compression spring 120 is mounted engaging the underside of the portion 118.

The levers 112 are each mounted on a pivot pin 122 mounted within the body 10 and extending through a slot 110. A cylindrical spacer sleeve 124 is mounted upon each pin 122 and is interposed between an edge of the latch portion 114 and the slot to maintain the latch lever in the proper position within the associated recess and slot. Depressing the portion 118 of the latch lever 112 will pivot the latch lever to the dotted line position shown in FIG. 4.

It is to be appreciated that each body constituting a coupling includes two latch levers 112 arranged in diametrically opposed relation. Thus, when the coupling bodies 10 and 10' are properly aligned, the operator may push the two halves together. The cam surface 115 on hook 116 will ride on the spacer 124 pivoting latch 114 and allowing hook 116 to ride over spacer 124. Upon the coupling halves being fully interconnected, the springs 120 will pivot the hooks 116 of the latch levers over the aligned exposed pin and sleeve of the other coupling half. As the latch lever portions 114 are offset with respect to the associated slot 110 and are of a width less than one-half the transverse width of the slot, it will be appreciated that the spacer sleeves 124 will be exposed to the hooks 116 and the latch levers are able to operate as described above.

In operation the coupling body halves 10 and 10' will be connected to hoses, pipes or other components of a fluid system by means of the fittings 22 and 22'. The coupling halves 10 and 10' will be coaxially related and aligned with each other such that the axes of the valves 50 and 50' will be aligned with the axes of the valves 76' and 76, respectively, as shown in FIG. 2. The coupling bodies 10 and 10' are then moved axially toward each other until the end wall 16 engages the end wall 16', as will be apparent from FIG. 2. The latch levers 112 will hook over the aligned pin and spacer 124 and 124' of the other coupling body to maintain the interconnection of the bodies.

As the aligned coupling body halves are moved toward each other, the male head surfaces 90 and 90' will engage the female valve recess surfaces 60' and 60 and as the configuration of the heads and recesses are complementary, air will be excluded from the system during the coupling of the halves. After the male and female valves engage, continued axial movement of the body halves toward each other unseats the valves 50 and 50' from their associated sealing rings 72 and 72.' Simultaneously, the outer ends of the valve sleeves 94 and 94' will be received within the openings 68' and 68 for sealing engagement with the sealing rings thereof. Thus, no fluid loss will take place during the interconnection procedure. Entrance of the valve sleeves 94 and 94' into the mating coupling body openings ceases upon the ridges 106 and 106' being received within the aligned recesses 74' and 74, respectively. Thereafter, the axial movement of the coupling halves unseats the valve sleeves 94 and 94' from their associated seal rings 86 and 86'.

Upon the coupling body halves being fully assembled, whereby the latch levers 112 may latch upon the aligned pin and spacers, the components will be in the relationship shown in FIG. 2. The springs 66, 66', 100, and 100' are fully compressed and fluid flow may take place through the passages 11, 11', 13, 13' and chambers 12 and 12'. As the fluid flow through the coupling occurs through both valve sleeves 94 and 94', little restriction to fluid flow is experienced, and as the valve stem ends, the shield 48, and the openings 38 are all shaped as to minimize turbulence, an effective fluid interconnection between the coupling body halves 10 and 10' is provided. In this respect, it will be noted that the diameter of the valve head 54 and the maximum diameter of the shield 48 is such that these components, when related as shown in FIG. 2, form a "streamlined" relationship.

Uncoupling is accomplished by the operator simultaneously depressing the four latch lever portions 118 and 118' to pivot the levers 112 and 112' out of engagement with their associated pin and spacer and then the couplings will be axially pushed apart by the springs in the coupling halves. During disconnection the operation of the valves will be the reverse of that described above.

The passage 11 and the associated opening 68 define a flow passage adapted to be sealed by the female valve 50, and the passage 13 and associated opening 82 define a flow passage adapted to be sealed by the male valve assembly 76. As each coupling body half contains both male and female valve components, the coupling halves may be formed of a truly identical configuration and it is not necessary to modify the coupling halves or incorporate intermediate sealing plates with the coupling halves.

Due to the dual valve arrangement within each coupling half, the axial forces necessary to connect the coupling halves when pressurized fluid is within the halves are substantially reduced over those coupling configurations wherein a single valve is employed in each coupling half. In the dual valve arrangement, the pressure between the coupling halves is equalized, or released, when either of the two valves is actuated. Thus, one valve acts as a relief valve for the other. Since the area of the valve of a coupling half in accord with the invention is smaller than a conventional single valve arrangement, the force necessary to connect the coupling halves together is significantly less than with more conventional arrangements.

It will, therefore, be appreciated that the coupling halves of the invention provide a versatility of connection of fluid systems which has not been heretofore possible. Inventory reductions are feasible, in that only a single type of coupling half is required and the necessary parts and components which have to be stocked for repair and maintenance purposes are substantially minimized over conventional coupling constructions. Use of the conventional O-rings also enhances the desirability of this construction.

While the operation of the latch levers is easily accomplished with the thumb and forefinger of each hand of the operator, all four latches must be simultaneously operated in order to disconnect the coupling halves. Thus, accidental uncoupling is unlikely to occur and as the levers are recessed within the configuration of the coupling inadvertent locking lever actuation is minimized. Furthermore, as a "double" locking action occurs on each side of the coupling halves, the couplings would not become disconnected even if one of the levers was accidentally released, and it is possible that a locking lever on each side of the coupling could be released without uncoupling the halves.

It is appreciated that various modifications to the described embodiment of the inventive concept illustrated may be apparent to those skilled in the art without departing from the spirit and scope of the invention, and it is intended that the invention be defined only by the following claims.

I claim:

1. A self-sealing fluid coupling comprising in combination:
    (a) a pair of identical interconnectable coupling halves each having body members with outer ends defining planar contacting surfaces and each having first and second wall and seal means defining first and second fluid passages therethrough respectively,
    (b) male valve means associated with the first passage of each body member including a valve stem fixed at one end to the body member, extending through said first passage and terminating in an enlarged head portion having a peripheral valve seat,
    (c) a sleeve valve slidably mounted on the stem and in the first wall and seal means in each coupling half and movable into contact with said valve seat to seal said first passage between said head portion and said body member,
    (d) a female valve movable within each said body member into sliding engagement with said second wall and seal means and operable to close said second passage,
    (e) biasing means in each coupling half biasing said female valve and said sleeve valve toward a sealing relationship with their associated passages,
    (f) said head portions in each coupling half being adapted upon interconnection of said coupling halves to engage the female valve of the other coupling half and unseat said female valve from said second wall and seal means and open said second passages,
    (g) said sleeve valve slidably entering and having sealing engagement with said second wall and seal means upon the unseating of the female valve therefrom,
    (h) sleeve valve engaging means on each body member adjacent said second passage operable upon the interconnection of said coupling to engage said sleeve valves and displace the same to open said first passages, and (i) means carried by each said body member for releasably securing said coupling halves to each other.

2. In a self-sealing coupling as in claim 1 wherein:
(a) said body members are cylindrical and include a longitudinal axis and said sleeve and said female valves of a common body member are mounted for movement in a direction parallel to the longitudinal axis of the associated body member.

3. In a self-sealing coupling as in claim 1 wherein:
(a) first and second valve support spider means fixed within each said body member,
(b) said stem in each body member being mounted upon said first spider means, and
(c) a valve guide in each body member mounted on said second spider means, said female valves being movably mounted on said guides.

References Cited

UNITED STATES PATENTS

| | | | |
|---|---|---|---|
| 407,922 | 7/1889 | Brown | 285—71 |
| 1,247,100 | 11/1917 | Field et al. | 137—599 |
| 2,033,348 | 3/1936 | Miller | 137—599 X |
| 2,815,226 | 12/1957 | Rowland et al. | 137—614.03 |
| 3,059,895 | 10/1962 | Brown | 137—614.03 X |
| 3,336,944 | 8/1967 | Anderson et al. | 137—614.04 |
| 3,367,366 | 2/1968 | Oliveau et al. | 137—614.05 |

WILLIAM F. O'DEA, Primary Examiner

DENNIS H. LAMBERT, Assistant Examiner

U.S. Cl. X.R.

137—614; 285—71